US006464505B1

(12) United States Patent
Pocock

(10) Patent No.: US 6,464,505 B1
(45) Date of Patent: Oct. 15, 2002

(54) EDUCATION SYSTEM AND METHOD FOR HOME SCHOOLERS AND THE LIKE

(76) Inventor: Rodney W. Pocock, P.O. Box 488, Antioch, CA (US) 94509

( * ) Notice: Subject to any disclaimer, the term of this patent is extended or adjusted under 35 U.S.C. 154(b) by 0 days.

(21) Appl. No.: 09/549,189

(22) Filed: Apr. 14, 2000

Related U.S. Application Data
(60) Provisional application No. 60/129,769, filed on Apr. 15, 1999.

(51) Int. Cl.$^7$ .............................................. G09B 19/00

(52) U.S. Cl. ...................................... 434/219; 705/500

(58) Field of Search ................................ 434/219, 107; 705/500

(56) References Cited
PUBLICATIONS

Maryland State Department of Education, Fact Sheet Regarding Home Instruction in Maryland, www.msde.state.md.us.*

* cited by examiner

Primary Examiner—Derris H. Banks
Assistant Examiner—Dmitry Suhol
(74) Attorney, Agent, or Firm—Robert B. Hughes

(57) ABSTRACT

An educational system to enhance the benefits derived from home schooling. A Home Schooling Program Center is established to coordinate between an existing school district and the home schooling units (i.e. the parent (s) and the student being home schooled). This Center enrolls the home school student as a student in the school district and assists the home school parents in accomplishing the proper education of the student. Various educational equipment, texts and other aids are provided. The home school students are periodically tested and gain full credit as other students enrolled in the school program, so that the student could qualify for further education and be fully certified high school graduates.

1 Claim, 1 Drawing Sheet

EDUCATION SYSTEM AND METHOD FOR HOME SCHOOLERS AND THE LIKE

This application claims the benefit of provisional application No. 60/129,769, filed Apr. 15, 1999.

BACKGROUND OF THE INVENTION a) Field of the Invention

The present invention relates to a system and method which is particularly adapted for people and families who have elected a home based educational program, and more particularly to such a system and method which provides active connecting links between the established educational institutions (such as school districts) and those who have elected not to have their children attend (or being involved with) the established educational institution, but would rather do "home schooling."

b) Background Information

The tradition of home education has been with us for millenniums. It began with the family or family units teaching their offspring the basic knowledge and skills for survival and accomplishing their day to day chores. History records that the concept of formal education took root about 3000 BC when the Sumarians (who lived in the Tigris/Euphrates valley) and the Egyptians each invented a writing system. This made possible the beginning of schools as we know them today. The schools which were established in Egypt were for the very few.

Probably the most significant educational advances in early Western History were made in Greece (particularly in Athens) from about 700 BC to about 300 BC. One of the luminaries (Socrates) who taught in Greece and employed an informal method of education which has been come to be known as "Peripatetic Method." The term "peripatetic" means "walking about place to place; traveling on foot," and Aristotle conducted his discussions by walking about in the Lyceum of ancient Athens. After being condemned to death in 399 BC for impiety and corrupting the young men of Athens (a little over 70 years of age), his basic teachings were carried on by Plato and then Aristotle.

During that time, Athenian education made substantial advances, but for early education, rather than establish a school, a trusted family slave took the students from teacher to teacher, each who specialized in a certain subject or related subjects. This continued until they were about fifteen years of age, and from ages sixteen to twenty they attended a government sponsored "gymnasium" where they were trained to be citizen/soldiers.

By the year 300 BC Greece became the acknowledged center of culture and education and many of the early Romans would send their children to Greece for education. As Rome became dominant from between 100 BC and 100 AD, Roman education flourished. After the fall of Rome and during the Middle Ages up until about 1500 in Western civilization the education was accomplished primarily by the Christian clergy.

Probably the greatest catalyst for education was Gutenberg's invention of movable type which made the modern printing press possible. This enabled books to be printed in large quantities which made formal education available for a large number of people.

By the late 1700's, in Europe there was a more of a nationalistic trend in education, and much the responsibility for education was transferred from the clergy. A number of European countries (Great Britain being an exception) adopted state controlled educational systems.

In the United States, shortly after the Revolutionary War, there was also a growing concern that public education should be provided. One of the main objectives was to give Americans common goals and a sense of national unity. In the 1800's, there was debate in the U.S. as to whether public funds could be used to support secondary schools. In a landmark decision of 1874, the Michigan Supreme Court settled the issue to legalize the practice that public funds could be used to support secondary education.

As we moved into the twentieth century, the concept of publicly funded schooling had become well entrenched in our education system. In the first half of the twentieth century, public education was almost entirely in the domain of the individual states. Subsequent to World War II, however, the federal government began taking a more active role. One of the major reasons was the funding of the GI bill and also enlarging the educational opportunities of veterans. In 1965 the elementary and secondary education act was passed by the U.S. congress, to furnish school districts with funds to help education children from low income families. In more recent years, the federal government has become more active and adopted certain standards and quite often federal funding for education is contingent on adopting "and adhering to" certain standards.

For some time now, rather than an elementary education up to a certain grade level being considered a "benefit" that should be provided for children, it has now become a requirement. As indicated above, some aspects of state funded education is controlled by the Federal government by setting certain standards, but much of the detailed planning for a basic curricula is done at the state and local level. Thus, while there are many options in the course of obtaining a basic education, there are requirements that certain basics be taught.

In recent years, particularly in the last decade or two, there have developed different views about what children should be taught and how they should be taught, and also who is ultimately responsible for the task. Thus, there has developed a growing number of families nationwide (approaching ten percent of the general population) who choose to educate their children at home (home schoolers). Over the past ten years, there has developed a philosophical and tolerance gap between two groups, namely:

a) those who support the traditional K–12 public school system as we know it, varying little from state to state throughout the nation;

b) the growing number of people who chose to educate their children at home.

Each group can point to myriad of successes and failures, claim to offer a far better prospective success than the other. The home schoolers can point to such things that the public schools face more and more incidents of violence, poor performance of students and nationwide teacher shortages. On the other hand, the teaching profession can take justifiable pride in its skill and accomplishments.

Accordingly, it is a major object of the present invention to provide a cooperative system and methods by which the established educational institutions can work cooperatively with the "home schoolers" to enhance the educational opportunities of the children who are in home schooling situations and to accomplish this in such a way as to meet the needs of all those involved. To state this another way, this system of the present invention is to "blend" or "connect" these two now separate systems and to accomplish the goals of each in a way that preserves the educational benefits provided by each system separately.

SUMMARY OF THE INVENTION

The system of the present of the present invention provides education needs for home schooling, where there exists:
  a) a School District which operates at least one school, with students enrolled in, and attending class in, the school;
  b) a plurality of Home School Units, each Home School Unit comprising at least one parent and one student who is being home schooled by the parent.

The system incorporates with the School District and with the Home School Units, a Home School Program Center to accomplish various functions. Basic functions relating to the Home School Program Center and the Home School Units include the following:
  i. accomplishing enrollment of students of the Home School Units in the School District;
  ii. the Home School Program Center maintaining school records of classes completed and credits earned to qualify the students of the home school units with full accreditation and credit for the classes completed and also as having graduated from the school district if such students have met the requirements of the School District for graduation;
  iii. establishing individual learning programs for students;
  iv. the Home School Program Center providing the basic equipment and materials (e.g. text, curricular materials, computers and other communication equipment along with other equipment as needed); and
  v. the Home School Program Center and the Home School Units accomplishing the proper testing at the benchmark points so that the courses taken by the student are properly certified by the School District.

Further, the Home School Program Center accomplishes certain functions with the School District, namely:
  i. coordination in initially enrolling the students and following tasks in maintaining the enrollment;
  ii. coordination and maintaining all the necessary records for that student and taking care of all other procedural matters and giving proper accreditation for all classes completed and graduating the students with the proper credits and credentials;
  iii. coordination in providing educational services, equipment and materials as requested from the Home School Program Center for the Home School Units.

In addition to the functions relating to the Home School Program Center and the Home School Units, as indicated above, in a preferred form the system comprises one or more functions selected from the following group, namely:
  i. initial contact between the home school units and the home school program center;
  ii. continuing periodic communications between an assigned certified teacher and the home school units, as reasonably required by the ILP of each unit;
  iii. counseling services by the way of problem solving, trouble shooting, and meeting special needs, provided for the home school units;
  iv. providing additional educational help, programs and material as needed to accomplish the ILP of each home schooling unit (either from the school district or other private resources);
  v. monitoring progress of various individual learning programs of the various students.

The system further comprises one or more Field Representatives for the Home School Units. This Field Representative would desirably be a person (or persons if more than one representative) having a reasonable balance of skill and/or experience in home schooling to coordinate with the Home School Units and the Home School Program to facilitate home schooling.

Also, in the preferred embodiment of the system, there are one or more parent advisory groups, made up from the Home School Units which meet to discuss goals, problems, possible improvements, and/or other matters relevant to activities of the Home School Units and the Home School Program Center.

In the Method of the present invention, there is established a cooperative program to enhance home schooling where there is an existing School District, and also a plurality of Home School Units, as described above. This program is accomplished by following the steps which are recited above as functions of the system. These and other features of the present invention will be described more fully in the following text.

DESCRIPTION OF THE PREFERRED EMBODIMENTS

A. Introduction

It is believed that a clearer understanding of the system and methods of the present invention, as well as the novel features thereof, will be obtained by first describing the present system that in large part exists throughout the United States (and possibly also in other parts of the world).

B. The Present System in the U.S. Relative to Home Schoolers

Figure 1:
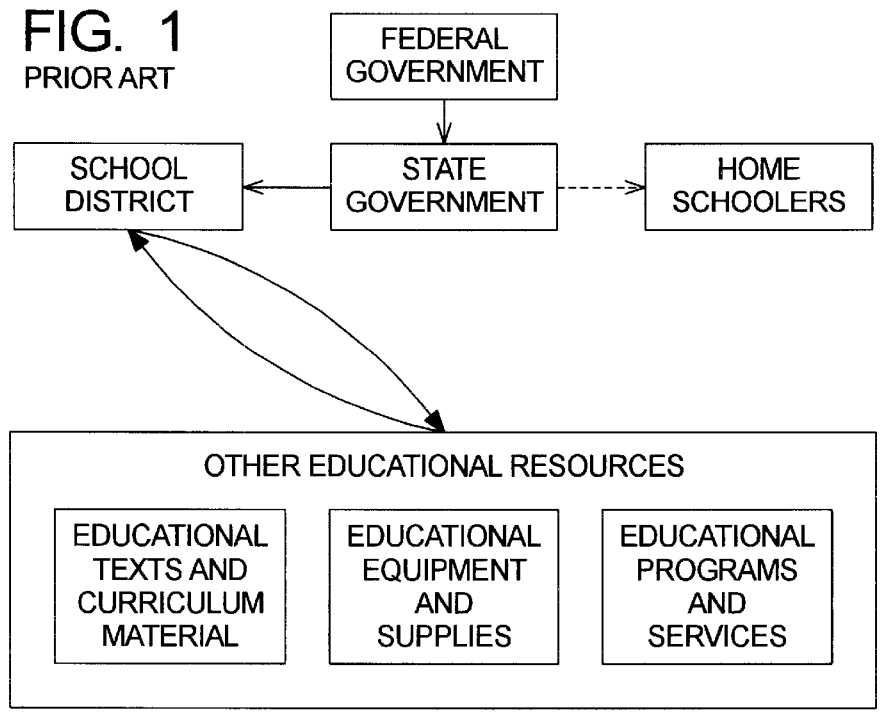
FIG. 1 is a schematic view illustrating the existing system by which home schooling is accomplished.

To describe the present situation in the United States, reference is first made to FIG. 1. The responsibility for publicly funded education falls primarily upon each state government. However, as indicated earlier in this text, in the last half century there has been increased government funding from the federal government for public education, and also the increased influence of the federal government. For example, a significant part of the funding of the federal government is contingent upon the various state governments adopting minimum requirements or standards for secondary education and also requirements that these be met.

Then the state government in turn sets more specific standards, establishes certain minimum curricula requirements, etc. Generally, responsibilities of secondary education in the various states is placed up into school districts, which operate essentially independently from one another, except for the control that is imposed by the state government. Most school districts are funded by some form of student "count" or attendance.

A school district in some respects operates as a business, in that it faces the usual business burdens of paying for the fixed overhead, as well as the variable expenses. Since each school district is obligated to provide basic education for the students that are in the district, the school must project population increases (or decreases) and plan accordingly, (e.g. school buildings, bus transportation, etc.). Thus, school planning is something of a balancing act. If it underestimates the student population growth that is expected for the next five or ten years, there is overcrowding, and emergency measures need to be taken to accommodate this overflow and meet basic educational needs. On the other hand, growth of student population is overestimated, with fixed overhead diminishing little or not at all, the school has to "tighten it's belt," possibly cut programs, etc. Accordingly, in terms of economic planning, a significant movement toward home schooling (and thus loss per student of funding in the school district) can create difficulties, and the school district would generally feel (and quite justifiably feel) that this would adversely affect the quality of education provided by the school district.

Another factor is that probably in most instances, when parents withdraw their children from attending the public schools in the district, they do so because they are dissatisfied with the education which is being provided in the school district. Or at least the parents that "home school" their children have very different ideas as to what the children should be taught. This can account to some extent for the "gap" between the home schoolers and the school district.

Another factor is that when parents do home school their children, the state in some instances imposes certain standards. However, generally, the standards of what occurs on a day to day basis, (or even a month to month basis) of home schooling are either non-existent or are not strictly adhered to. However, to maintain the right to home school in some states, the student that is home schooled would be tested periodically to see if the home schooling has been carried out in a manner to meet minimum standards. This situation is indicated by the broken line shown in FIG. 1 connecting the state 10 with the home schooler.

To now look at this situation graphically, reference is again made to FIG. 1. The state government, which is indicated at 10, (influenced and to some extent controlled by the federal government which is indicated at 12) provides the funding and basic control of the various school districts. In many respects, each school district is autonomous in that it can elect its own school board, select the employees it hires, set curriculum within the guide lines set by the state, and in general make many decisions locally.

In FIG. 1, the school district, indicated at 14, has been shown being located on one side of the state government, and the home schoolers, indicated at 16, on the other. In large part, there is substantially little, if any, direct contact between the home schoolers and the school district. Also, as shown in FIG. 1 is a broad category of other educational resources, indicated generally at 18, in which are three groups of business entities and people in the private sector. Namely (a) educational texts and curriculum materials 20 and educational equipment and supplies 22, and (b) educational programs and services 24.

In theory, since the providers of these various products and services are in the private sector and would be pleased to sell to most all types of purchasers, including home schoolers, as a practical matter there is a gap in this line of communication. The advertising and other sales efforts of these various private companies (and individuals) is directed more toward the established school districts, and the home schoolers are less informed of not only the existence of these, but also are not in the position to evaluate the quality in any depth.

Let us summarize our present educational system and how the home schoolers fit in. This can be summarized as follows:

a) The federal government influences the state government relative to education by providing funding and broad guidelines and standards, the implementation of which may or may not be connected to some or all of this funding.

b) The state government provides for school districts. Standards which are more specific than those provided by the federal government, provides funding, and sets basic rules by which the school districts must operate.

c) The state government has very little to do with the home schoolers, except to provide a minimum amount of control on an infrequent basis simply by checking whether or not the home school student is obtaining an adequate education.

d) In general, the school district is in large part "disconnected" from those students in the district who are home schooled.

e) The private sector which provides products and services for education would have continuing (those who provide education texts, educational equipment and supplies, and educational programs and services) have contacts with the established school districts, but as a matter of practical business operation, less contact with individual home schoolers.

f) Yet the home schoolers have in large part separated themselves from the "establishment" in their school district and when educational resources are needed, they are left to their own resources and /or others.

C) Overview of the System of the Present Invention.

The spirit of the system and methods of the present invention can probably best be expressed in the words of its originator, Mr. Pocock, who states that this system was initiated to ". . . provide resources and support to parents who have elected to educate their children in their home. The objective is to build and foster a community of learners who views education as not confined to the traditional four walls of a classroom, but rather a free flowing exchange of knowledge and ideas world wide through technology. This system brings a fresh approach of mutual trust among parents and schools by honoring parental choice in curricula materials and instructional methodology based upon the needs of each and every individual child."

"Perhaps the most significant component of this mission statement is the reference made to instilling trust between parent and public schools. The evidence of this trust is the fact that parents are allowed to choose both the content of curricula materials and the methodology to be employed in the delivery of that content in the teaching of their children, so long as minimal standards are met at a level equivalent, or above, regular classroom students in a particular district. It is this concept of choice that is the most singularly and most unique concept of this system."

Figure 2:
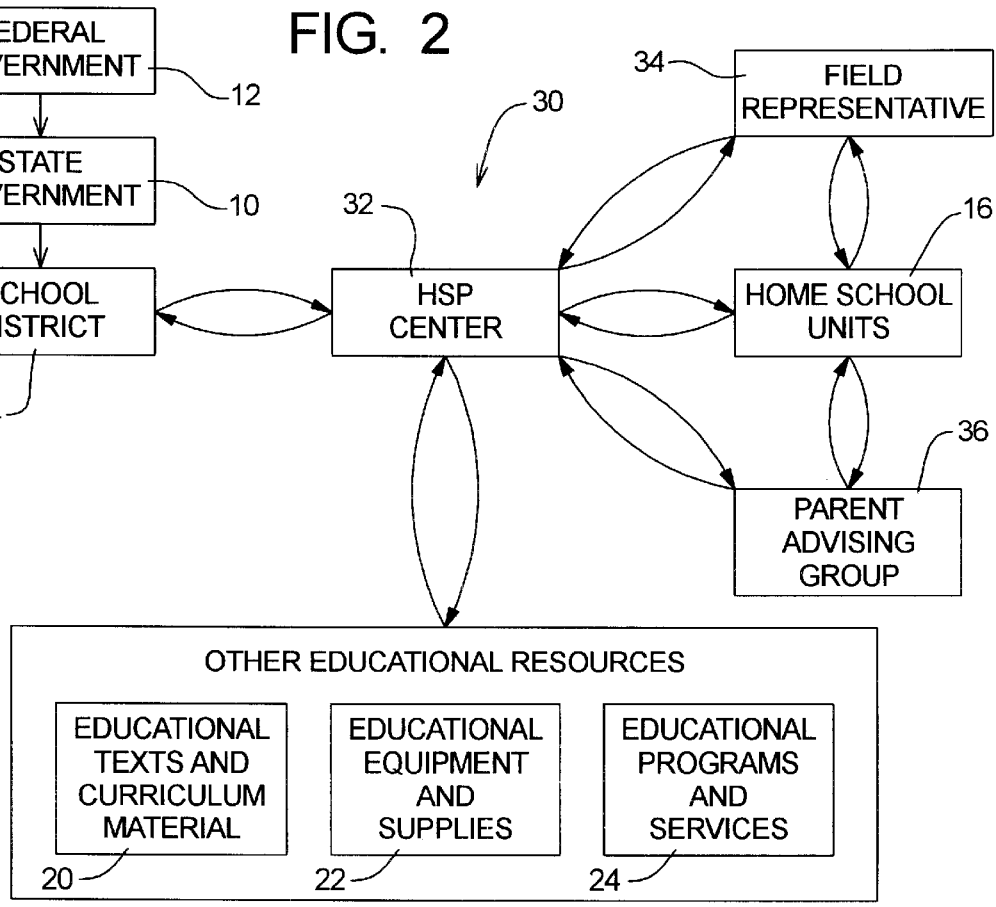
FIG. 2 is a schematic view illustrating the system and method of the present invention.

With the foregoing being given as background information, let us now turn our attention to FIG. 2, which is a schematic representation of the system of the present invention, indicated generally at 30.

In viewing the main components of the new system, as displayed in FIG. 2, and comparing this with the prior art system in FIG. 1, one item becomes particularly evident. It will be noted that the block in FIG. 1 representing the state government at 10 has, in the new system shown in FIG. 2, been taken out of the central position, and has been moved to another location in FIG. 2 where it still has its direct link to the School District 12. In the central location in the new system of FIG. 2, there has been positioned a service center for home school units, this being called an "HSP Center" (i.e. a "Home School Program Center").

The functions of this HSP Center 32 will be discussed in more detail later in this text, but for the present, it can be described as being made up of one or more teachers who work with the home schooling program and an administrative person or staff which handles various clerical matters, providing equipment and services for the home schoolers, and other administrative needs. Further, this HSP Center 32 is a communication center where it gathers the information necessary for the operation of the home schooler program, receives information from the home schoolers and others involved in the program, coordinates this program properly and also takes proper action in accordance with the needs indicated by such communications.

At this point, let us now pause and look at these communication links. First (and very important), this HSP Center 32 has a direct operating link with the School District. Further, the HSP Center 32 has a direct link to the people and entities that provide the educational texts, equipment and supplies, and also to the entities and individuals who provide the educational programs and services.

Then this HSP Center 32 has these very important direct links with the home schoolers individually. Further, there is a direct link to the Field Representatives, indicated at 34, and a direct link to the Home Schooler advisory Group or groups designated 36. Now lets look at the effect of these links or connections.

With regard to the status of the home schoolers, the students that are being home schooled are actually enrolled as students in the School District. While the policy in the various state may differ as to financing of a school district relative to students, in the very large number of states where the money given to the school district depends upon the students enrolled. Further, the educational resources of the school district are fully available to these home schoolers who are now students registered as students in the school district.

Also, the Home School Program Center 32 (HPS Center) has links to the other Educational Resources 18 so that these can also be made available in an efficient manner to these home school students. Yet, the objectives of the parents and students in the home school programs still have substantially the same degree of freedom that they had previously in terms of the choice and content of curricula materials, methodologies to employ, etc.

D) The Main Components of the System of the Present Invention

Let us now examine each specific component of this program. With regard to terminology, the term "student," as it would apply to any one household shall be meant to include not only an individual student but also the two or more students in that household. Also, the term "parents" will be used to denote either two parents (if that is the situation), a single parent, or a guardian or other person who is responsible for that student. The parents and the student of a family or household will be designated by the term "Home School Unit".

The term "School District" is to be used in a broader sense to designate an educational entity, whether or not designated a "School District" in accordance with practice of any particular state in the United States or elsewhere, where education is provided to the students through one or more schools where education is given in large part in a classroom environment.

Also, for convenience, when any person is referred to by a pronoun (e.g. he, she, his, her, etc.) this will be presented in the masculine gender, with the understanding that this includes both genders.

1. The Initial Contact and the Assessment.

The first step is that the parents and student are contacted by the HSP representatives and the entire program explained to both the parents and the student (i.e. the "Home School Unit").

At that same time or at a later time, a teacher or other representative of the program would have made an initial assessment of the situation and identified the reasonable needs of the student and the parents.

For example, one of the parents might already have been a teacher and be fully qualified and willing to handle all the teaching requirements herself (or himself). In other instances, the parents may be able to handle certain courses, such as history, but may not feel at all qualified to handle math courses, English grammar, English composition, science courses, etc. Another situation is that while the parent may have capabilities in some or all of the academic areas to be handled, the work schedule of that parent may not fit in with the needs of the student.

Another situation is that the student himself may have individual needs. These needs may be met possibly by specialized equipment or certain additional and/or special programs. For example, in the category of educational programs and resources, indicated by the block at 22, there in the private sector a wide variety of programs on different academic subjects. For example, the parent may want to teach mathematics, but may feel weak in that area. There are video programs which explain the teaching techniques for mathematics and actually explain this in a teaching environment, such as a teacher writing the problems on a chalkboard and leading the student through these. It is often difficult and time consuming for the home schooling parent to seek out these various programs and teaching aids. However, personnel at the school district (and presumably at the HSP Center) have access to (and likely already acquired familiarity with) these and would also have knowledge of (or at least be able to obtain the information about) which of these programs would be suitable for that situation.

So in the following discussion, it will be assumed that this assessment has been completed and that the parents, the student, and the program representative are fairly well settled on the type of program that would fit this student. Obviously, as time goes on, adjustments to this program may need to be made. The manner in which these adjustments are made will be discussed later in this text.

Let us now consider other components of the program.

2. Instructional Material and Equipment for the Home School Units.

All of the texts and other instructional material and equipment for the student is supplied by the Home School Program Center without any charge.

Each student will be provided with a computer, and e-mail. Also, the student would be provided with a telefax. However, if other communication equipment is available over the Internet or other electronic media that would take the place of the telefax, that could be used instead.

While the computer is an important element, it is believed that its role should not be overemphasized. The computer will not take the place of the parents and their efforts to guide and teach their children. In fact, it is believed that in some instances the importance of the computers is dangerously overestimated in the role that they should play in a child's formative years of education. With that being said, however, no one can question that the computer can greatly facilitate certain aspects of a child's learning, and there is significant research to support the importance of the computer in certain areas of the curricula, such as writing, because of the ease at which the students may edit their work. In addition, as part of the program there could be on-line course to offer to the student if the parents choose that option. For example, many courses are being offered on the Internet, and many educational courses on the Internet are interactive.

Possibly the greatest use of the computer in families enrolled in the program is to link the families together as well as to the HSP Center and Field Offices via e-mail. Parents may compare notes, have questions answered by certified teachers of the HSP Center, order curricular material and keep up with any deadlines, testing and other important items they should know. This is a very efficient, inexpensive way for the school district to keep in touch with enrolled families.

3. The Role of the Certified Teacher.

The term "Certified Teacher" denotes a teacher who is qualified as a teacher in the School District and has the "credentials" to function in the capacity as a "teacher" for this program. In some states, there is a certain ratio of how many courses or students that can be "taught" by that teacher in a correspondence course, independent study or distance delivery program. For those home school situations where the parent is actively going to be tutoring the student on a regular basis, that parent is the "teacher" in terms of performing the necessary tasks to accomplish the students education. In that case, the active role of the certified teacher would be minimal. Yet the certified teacher would be available for "trouble shooting", problem solving, seeking out additional aides for home schooling parent, etc. In other instances, the teacher may be taking a more active role.

4. The Field Representatives.

A Field Representative is an experienced, successful home schooling parent who is familiar with "what works in home schooling" and who is willing to share their experience with other "less seasoned" parents just trying home schooling for the first time. The Field Representatives could be part time representatives and they could work out of their home. In fact, the Field Representative may be an active home schooling parent who is willing to help others on a part time basis. It is expected that the Field Representative would work in her or his own home, mostly over the telephone or via e-mail, answering hundreds of questions about everything from curricula to policy about the program. They would have the credibility among the home shcoolers that the Certified Teachers may not have because they are "one of them." These Field Representatives can play an important role in building trust among the home schooling parents.

5. The Individual Learning Plan.

It was indicated earlier herein that at the time of the initial contact and interviews with the home schooling parent and student is conducted, decisions are made regarding the learning plan for that student. The concept of placing each and every child on her or his own learning course is actually an adaptation of a special education concept of the "individual education plan." For students with special needs, the individual education plan is literally a complete directive to a school regarding what and how each specific child is to be taught.

It is presently connotated that the parents themselves submit the Individual Learning Plan for the student or each of their student children. In it, the parents address learning goals and objectives in each content area for the school year. Experience has taught that parents appreciate being requested to do this, because it adds a new dimension of planning to their instruction, and provides an objective means by which the progress of each child can be monitored.

This is a critical and delicate part of the relationship between the home schooling parent (s) and the certified teacher. It is necessary that the teachers make certain that the Individual Learning Plan contains learning objectives that are age appropriate for the child, yet while doing that not intimidate the parent (s) and removing the all important element of choice by the parents (and the student).

At the end of certain time periods of the year, the certified teachers are required to inquire about the progress each child is making on her or his Individual Learning Plan. At those times if the teacher and parent agree, adjustments may be made as necessary to the ILP.

6. Parent Advisory Committees.

When an adequate number of "first families" are enrolled in the program, each region would have a volunteer committee made up of parents who would make recommendations to the personnel at the program center concerning policies and procedures of the programs and ways in which there could be improvement. The Parent Advisory Committee (s) can make extremely valuable contributions, but is not empowered to perform or conduct any of the tasks which are assigned to the personnel at the HSP Center. Each Parent Advisory Committee would normally attempt to meet once a month during the school year. For example, the membership of each committee member could range between seven and thirteen members. A representative form the HSP Center could possibly present at such committee meetings. The Parent Advisory Committee are advisory and do have discretionary of a school board.

7. Special Education.

This program would be directly connected with the School District itself. Accordingly it does not attempt in any way to "skirt around" special education codes and statutes. Rather, this program puts the individual needs of each and every student first, before anything else, and this certainly includes those students with special needs. Present analysis of the program which has been conducted thus far indicates that many students with special needs may be better served by not participating in this home schooling program and be in a more traditional classroom environment. There can be various reasons for this. One is that children of special needs are often in need of opportunities to socialize with other students, and may not benefit from an educational environment which closes them off to such contacts. Also, even though the student may not have special needs relative to obtaining the educational goals, the personality, character, and general make-up of the student may be such that the home schooling environment facilitated by this program would not meet the needs of the student as well as the traditional classroom environment.

8. Learning Programs for the Home Schooling Parent.

Home schooling parents, just like other teachers, can benefit from frequent quality workshops covering a wide range of subjects. Such works can be of substantial benefit because they have a quite positive effect on home teaching. Such workshops could cover the teaching of reading, mathematics, creative writing, home economics, and science. Present analysis indicates that these are of substantial help, and that these could be offered to the home schooling parents at no charge.

9. Accountability (Standardized Testing).

Virtually every state requires that at certain points, each student enrolled in a public school be tested on her or his extent of mastery of basic academic skills. Typically, such tests are administered at "benchmark points," such as first, fourth, eighth, and eleventh grades. The program parents would be thoroughly informed at the time of enrollment that the students are required to participate in such testing. It may be that a state does not require such testing for charter schools, correspondence schools, or independent programs. Nevertheless, present analysis indicates that such testing should be required for those who participate in the program.

It should be noted that many educators oppose standardized testing because of increasing pressure to raise scores and a growing tendency to "teach to the test." Some would view a charter school as an opportunity to break away of such testing, thereby teaching "higher level thinking," or areas of the curriculum that are more "exciting" or "challenging" to students. However, while there may well be validity to that view, the implementation of the present program is predicated on the thinking that if basic skills, such as reading comprehension and math computation are never tested, there is a good chance they will never be taught.

In the implementation of the present program, it is contemplated that standardized tests in controlled, secured conditions would be conducted each year as a minimum to whatever grades the state involved require such testing. It does so in testing centers (usually to field offices) that requires parents to bring students to the centers at the appropriate times.

In some teaching districts which cover a large geographical area, if there are hardships in the students coming to the program center for testing, accommodations could be made in this regard. The data presently available indicate that on the average, home school children score higher than their classroom counterparts. Thus, it is contemplated that in this program, testing is a very positive factor upon the acceptance of the program by the education community.

10. The Home Schooling Program Center (HSP Center).

The more detailed discussion of the program center has been postponed until the end of this text, mainly because many of the functions which are performed by the program center become evident when the various components of the entire program are described.

Nevertheless, it would be prudent to summarize these various functions. The HSP Center does not necessarily have to be a "center" in a geographical sense, even though it may well have advantages to have the personnel directly involved in the program be at one location. Rather, it is a "center" in terms of its functional characteristics. This HSP Center can be compared to the central processing unit of a computer where it transmits request and data to the various entities to which it is connected, receives inputs and requests from the same entities, and then coordinates these into a properly functioning network.

However, even though the efficient and timely performance of these various functions is extremely important to the program there is another very vital "human" ingredient that must be added.

For this program to succeed, it has to be imbued with an attitude, dedication and optimism to make the program succeed. Further, returning to the earlier quotations from Mr. Pocock, the originator of this system, we have to recognize the importance of the concept which he stated in the following words:

"Perhaps the most significant component of this mission statement is the reference made to instilling trust between the parent and the public schools. The evidence of this trust is the fact that the parents are allowed to choose both the contents of curricula materials and the methodology to be employed in the delivery of that content and the teaching of the children . . ."

It has to be recognized that parents have already made a decision that they are going to take over the primary responsibility for teaching their children. This program is to bring them together with the School District so that the goals of these parents and the students are enhanced further by the cooperation with the School District. Thus, the most critical human relationships in this program are those between the personnel of the HSP Center and the parents and students of the Home School Units, and also with the Field Representatives and also the Parent Advisory Committees.

With the foregoing in mind, now let us summarize the main functions of the HSP Center in cooperation with the Home School Units. These are as follows:

i) The initial contact with the parents and students and explaining the program to them.

ii) Accomplishing enrollment of the students in the program.

iii) Maintaining student records, including cumulative folders for grades K–8 and for grades 9–12 Carnegie credits earned and also including any dual college credits earned, also (when requested to do so) supplying such records to other School Districts, and requesting records from schools previously attended by the students.

iv) Establishing the Individual Learning Programs for the students (ILP's).

v) Providing the basic equipment (computers and other communication equipment along with other equipment as needed).

vi) Continuing the periodic communications between the assigned Certified Teacher and the Home Schooling Units, as reasonably required by the ILP of each unit.

vii) Counseling services in the way of problem solving, trouble shooting, and meeting special needs.

viii) Providing additional educational helps, programs, or material as needed to accomplish the ILP of each Home Schooling Unit (either from the School District, or other private resources, etc.).

ix) Monitoring progress of the various Individual Learning Programs of the various students.

x) Accomplish the proper testing at the benchmark points so that the courses taken by the student were properly certified by the School District.

xi) Throughout the program coordinating with the Field Representatives and the parent advisory groups to attend to various matters (major and minor) that might arise.

To again make the comparison with the HSP Center and a computer network, the whole system is "driven" by assessing the educational needs and related needs of the students, initiating programs to meet these needs (ILP's), and then bringing the educational, material and human resources into play to make the implementation of the ILP for each student successful. This is the starting point, and the main communication link is between the HSP Center and the Home Schooling Units. Then (again to use the analogy of the computer network) the requests and information transmitted and received to the other involved entities are in response to the needs of the HSP Center to in turn meet the needs of the Home School Units.

Thus, in addition to the eleven functions which were listed earlier herein that are accomplished between the HSP Center and the Home School Units, then there follows the functions which the HSP Center performs relative to the other entities of the system illustrated in FIG. 2. These are as follows:

a) Coordinating with the School District and initially enrolling the students and follow up task and maintaining the enrollment.

b) Coordinating with the School District and maintaining all the necessary records for that student and taking care of all other procedural matters in properly graduating the students with the proper credits and credentials.

c) Providing educational services, equipment and materials, as requested from the HSP Center for the Home School Units.

Coordinating through the School District with the state and federal government authorities to ensure compliance with the rules which would affect the Home School Units.

Further, the HSP Center would coordinate with the other educational resources indicated in the lower part of FIG. 2. This would entail ascertaining the needs of the various Home School Units, and then obtaining texts, materials, equipment, supplies, programs and other services as needed to meet the needs of the Home School Units.

It is to be understood that various modifications, additions, improvements, etc. could be made to the systems and methods of the present invention without departing from the basic concepts thereof. Also it is to be understood that while preferred embodiment or versions of the components and methods involved in this system are presented, others would be possible. For example, while the HSP Center is described in a preferred form, this "center" could be established in various ways. For example, personnel already employed by the School District (or additional employees hired by the School District) could simply function directly out of the School District facilities. Alternatively, this HSP Center could be established as a separate unit, with the personnel still being employees of the school district. Yet another alternative form would be to establish the HSP Center as a distinct group, and even to the extent that it could be acting as a separate legal entity having a contractual working relationship with the school district. Such things would depend upon the educational system in that state and other factors.

It is to be understood that the various terms used herein and in the appended claims are within the broader scope of the present invention to be given their broadest meaning. For example, as indicated previously, the term "School District" is (as discussed earlier in this text) intended to refer to an educational entity which provides education in large part in a classroom environment, and the term "Parent" is interpreted more broadly to include a guardian or other responsible person or persons for the home school student.

As a final note, it should again be emphasized that one of the primary goals of this system is to develop a system that "bridges the gap" which has developed between established education and home schoolers, find out what they have in common and how they can benefit from cooperating with one another, and then putting the system into practice.

I claim:

1. A method for providing educational needs for home schooling where there exists:

a) a school system comprising a school district and at least one school in the school district, with students enrolled in, and/or attending classes in the school;

b) a plurality of home school units; each home school unit comprising at least one parent/guardian and at least one student who is being home schooled or is intended to be home schooled by the parentguardian;

said method comprising:

a) establishing a home school program center which is operatively linked to the school system and is funded in conjunction with the school system;

b) accomplishing initial contacts between the home school units and the home school program center;

c) accomplishing by the home school program center the enrollment of students of the home school units in the school system;

d) establishing by the home school program center for each student of each home school unit an independent learning program to satisfy school system requirements and the needs of the student of the home school unit;

e) providing through the home school program center the equipment and course materials for the students to accomplish goals of the independent learning program, and acquiring from the school system such equipment and course materials as needed from the school system;

f) maintaining by the home school program center communication links between the home school program center and the home school units to provide assistance, as needed, and at the same time maintaining communication links by the home school program center with the school system for acquiring resources available from the school system for the home school units and, also maintaining communication with other educational resources selected from one or more of the following, namely providers of texts and curriculum materials, providers of educational equipment and supplies, and providers of educational programs and services to meet the needs of the students of the home school units;

g) accomplishing through the home school program center the monitoring of the program of the individual learning programs of the home school units, and testing of the students of the home school units at least at benchmark points;

h) coordinating by the home school program center with the school system in the monitoring of said individual learning programs, and said testing at the benchmark points, so that said progress and said testing at benchmark points can be certified by the school system;

i) coordinating by the home school program center with the school system in maintaining necessary records for the students of the home school units, and all other procedural matters, in properly graduating the students of the home school units with the proper credits and credentials.

* * * * *